United States Patent [19]
Tulloch et al.

[11] Patent Number: 5,618,594
[45] Date of Patent: Apr. 8, 1997

[54] COMPOSITE THERMOCOUPLE PROTECTION TUBES

[75] Inventors: Kenneth F. Tulloch, Hyde Park; Lee E. Burns; Hemandt D. Desai, both of Reading; Raymond L. Taylor, Swampscott, all of Mass.

[73] Assignee: CVD, Incorporated, Woburn, Mass.

[21] Appl. No.: 421,177

[22] Filed: Apr. 13, 1995

[51] Int. Cl.$^6$ .......................... B29D 22/00; A47G 19/22; B32B 1/04
[52] U.S. Cl. .......................... 428/34.1; 428/34.4; 428/76; 428/67; 428/70
[58] Field of Search .................. 428/76, 67, 70, 428/34.1, 34.4

[56] References Cited

U.S. PATENT DOCUMENTS 5,315,092  5/1994  Takahashi et al. ............ 219/497
5,374,412  12/1994  Pickering et al. ............ 423/346

*Primary Examiner*—Patrick Ryan
*Assistant Examiner*—Cathy F. Lam
*Attorney, Agent, or Firm*—Wayne E. Nacker; Gerald K. White

[57] ABSTRACT

A semiconductor protection tube is a ceramic tube with a layer of silicon carbide covering at least a portion of the tube adjacent an open front end of the tube and extending forward of the open end to form a hollow, closed-end tip. The protection tube is formed by providing the ceramic tube, inserting a mandrel through the tube to extend forward of the front end, and depositing silicon carbide by chemical vapor deposition over at least a front portion of the ceramic tube and over the forward-extending portion of the mandrel. Subsequent removal of the mandrel completes the production of the protection tube.

8 Claims, 2 Drawing Sheets

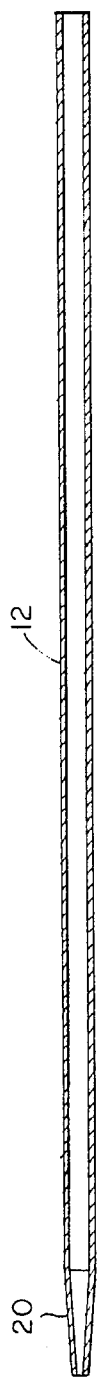
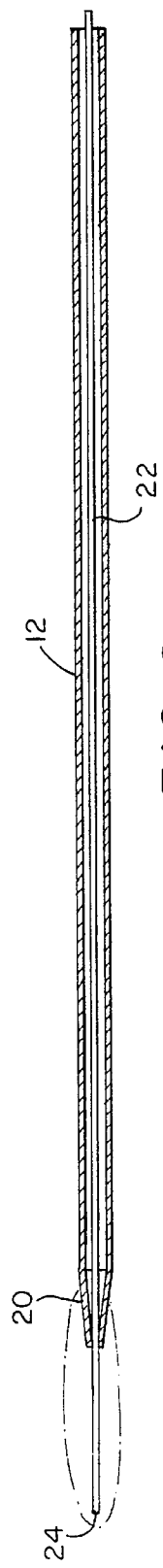
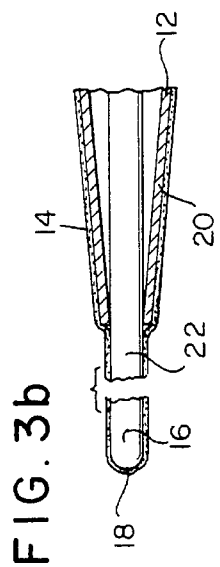
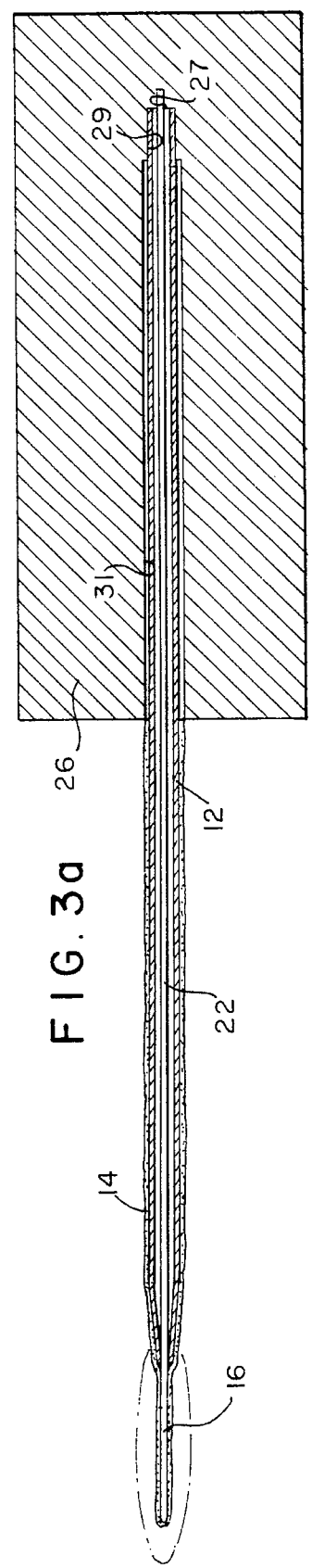

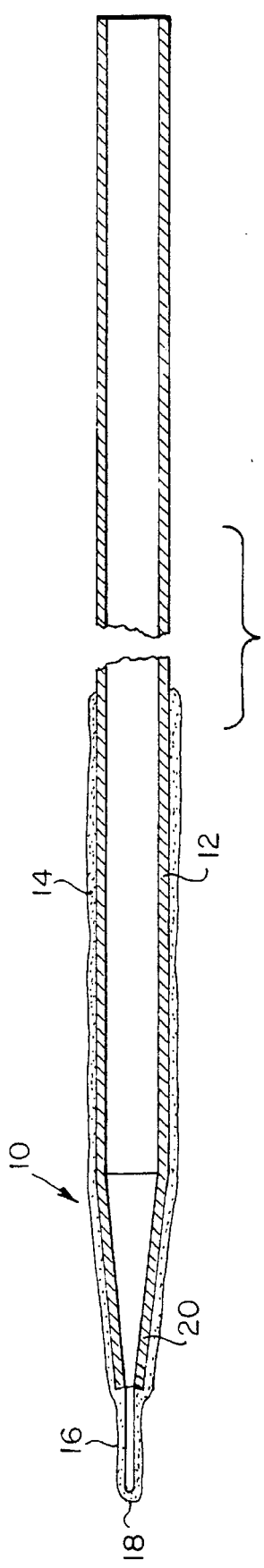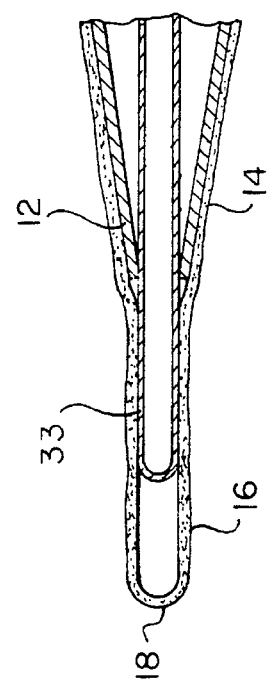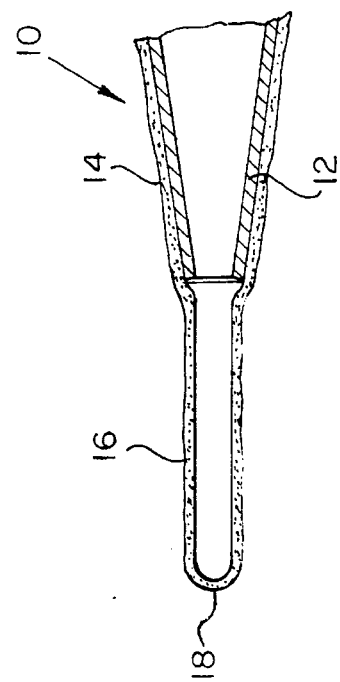

COMPOSITE THERMOCOUPLE PROTECTION TUBES

The present invention is directed to thermocouple protection tubes for use in high-temperature environments and to a method of making such protection tubes.

BACKGROUND OF THE INVENTION

In high-temperature furnaces, such as furnaces used for semiconductor processing or heated chambers used for metal organic chemical vapor deposition (MOCVD), it is necessary to monitor the temperature closely adjacent to where the process is being conducted. Thermocouples are used to monitor temperature; however, because of the corrosive environments present in such heated furnaces or chambers, it is necessary to sheath the thermocouple in a protection tube. The protection tube must not only be formed of material which withstands the corrosive processing environment, but should have a high coefficient of thermal conductivity, whereby the sheathed thermocouple will be rapidly sensitive to temperature fluctuations. For semiconductor processing applications, the protection tube must be chemically inert and of suitable chemical purity in order not to contaminate the wafer during processing. One particularly suitable material for thermocouple protection tubes is chemical vapor deposition-produced silicon carbide (CVD-SiC) as taught, for example, in U.S. Pat. No. 5,315,092, the teachings of which are incorporated herein by reference.

Solid CVD-SiC protection tubes are known. Production of these involves a significant amount of machining. Furthermore, while the high coefficient of thermal conductivity promotes responsiveness, the high thermal conductivity also promotes equalization of temperature throughout the tube, i.e., the temperature of the tube body tends to be translated to the tip where the temperature is being measured.

SUMMARY OF THE INVENTION

In accordance with the Invention there is provided a composite thermocouple protection tube. The body of the thermocouple protection tube is an elongated tubular structure formed of a ceramic material. At least a front portion of the tubular ceramic structure is coated with CVD-SiC, which coating includes a coextensive portion which extends forward of the ceramic tubular structure forming a tubular tip which is closed off at its front end. To form the thermocouple protection tube, the ceramic tubular structure is formed and a mandrel inserted therethrough so as to protrude from the front end of the protection tube. SiC is chemically deposited on the mandrel and on at least a front portion of the ceramic tubular structure. Subsequently the mandrel is removed, leaving the CVD-SiC as the tip portion of the protection tube and as a thin layer over at least the front portion of the tubular structure.

BRIEF DESCRIPTION OF THE DRAWINGS

FIG. 1 is a cross-sectional view of a ceramic tube which forms part of the composite protection tube of the present invention.

FIG. 2a is a cross-sectional view of the ceramic tube of FIG. 1 with a mandrel extended therethrough.

FIG. 2b is an enlarged cross-sectional view of the front or tip portion of the ceramic tube and mandrel of FIG. 2a.

FIG. 3a is a cross-sectional view of the ceramic tube/mandrel assembly of FIG. 2a coated with CVD-SiC.

FIG. 3b is an enlarged cross-sectional view of the CVD-SiC coated front portion of the ceramic tube/mandrel of FIG. 3a.

FIG. 4a is a cross-sectional view of the protection tube, the mandrel being removed from the FIG. 3a Assembly.

FIG. 4b is a cross-sectional view of the front or tip portion of the protection tube of FIG. 4a.

FIG. 5 is a cross-sectional view of the front end of the protection tube of FIG. 4b with a wire thermocouple inserted therein.

DETAILED DESCRIPTION OF CERTAIN PREFERRED EMBODIMENTS

With respect to the Figures, the left side in each case illustrates the end which extends into the heated furnace or chamber and is described herein as the "front", whereas the right side in each case illustrate the end which extends through the wall of the furnace or the chamber and is described herein as the "rear". Dimensions used herein are illustrative of one currently preferred design for one particular thermocouple application; however, it is to be appreciated that the dimensions are not required for the invention, and protection tubes in accordance with the invention may be manufactured with a variety of dimensions.

The thermocouple protection tube 10 of the present invention is shown in FIG. 4a and comprises a ceramic tube 12 and a CVD-SiC coating 14 that extends forward of the ceramic tube to form a hollow tip 16 with a closed-off front end 18.

It is felt that to more fully understand and appreciate the invention, the protection tube 10 is most appropriately described in terms of its fabrication; accordingly, reference is made to FIG. 1 wherein the ceramic tube 12 is provided. The ceramic tube 12 is formed of a material, such as alumina, which can withstand the high-temperature environment to which the protection tube 10 will be exposed but which is also, preferably, thermally insulating. Also, the ceramic tube 12 is preferably formed of a material with a coefficient of thermal expansion close to, but no less than, that of CVD-SiC. Alternatives to alumina include, but are not limited to, mullite and zirconia.

The illustrated ceramic tube 12 has a circular cross-section throughout. Other cross-sections, such as square, are conceivable, and are considered within the scope of the present invention, but would be much more difficult to manufacture. For most of the length of the illustrated ceramic tube, the cross-section is uniform, having both a uniform outside diameter (O.D.) and a uniform interior diameter (I.D.). The illustrated ceramic tube is 0.135" O.D.× 0.100" I.D.×7.0" long. A small frustaconical tubular front end portion 20 that is 0.5" long is necked down to 0.06" O.D.×0.04" I.D.

In low volume production, the ceramic tube may be made by forming the base by machining rod or tube stock to the required shape. In large volume production, the ceramic tube would be cast, thereby reducing cost.

With reference to FIG. 2a, a rod-shaped mandrel 22 having an O.D. closely corresponding to the I.D. of the front end of the ceramic tube 12 and a length greater than that of the ceramic tube is extended from the rear end of the ceramic tube so as to extend forward, e.g., 1" forward of the front end of the ceramic tube. The illustrated mandrel 22 has a rounded front end 24. The mandrel 22 is formed of material, such as graphite, or ceramic, e.g., alumina, which will withstand the deposition temperature of CVD-SiC. To facilitate removal of the mandrel 22, the material should either be burnable, e.g., graphite, or have a coefficient of thermal expansion substantially higher than CVD-SiC, whereupon differential contraction subsequent to deposition of CVD-SiC will allow for removal of the mandrel.

The rear end of the ceramic tube 12 is shown masked with a cylindrical mask 26 formed of graphite or ceramic, e.g., alumina in FIG. 3A for 3" at its rear end to prevent CVD-SiC from depositing on the rear end of the ceramic tube. The mask 26 is bored from its front end. A narrow bore portion 27 extending most rearwardly is matched to the diameter of the mandrel 22 so as to receive the rear end of the same. A short, greater diameter, coaxial bore portion 29 is matched to the outside diameter of ceramic tube 12 so as to receive and support the rear end of the same. A main coaxial bore portion 31 is of diameter slightly larger, e.g., about 0.040" larger in diameter than the outside diameter of the ceramic tube 12. This portion provides the masking, the small spacing between the ceramic tube 12 and mask 26 preventing deposition gases from entering to any significant extent, thereby preventing silicon carbide deposition on this portion. At the same time, the spacing prevents CVD-SiC deposition from freezing the mask 26 to the ceramic tube 12, thereby facilitating subsequent removal of the mask. This is a preferred method of forming the protection tube so that the rear end, which is to extend through the wall of the furnace or chamber is only formed of poorly thermally conducting ceramic without a layer of highly thermally conducting SiC. The length of the masked portion of the ceramic tube 12 is preferably as long as possible so that the coating 14 is as short as possible, consistent with structural integrity of the silicon carbide coating 14 on the ceramic tube rearward of the tip 16.

SiC is then deposited on the assembly of the ceramic tube 12 fitted with the mandrel 22 by means known in the art. U.S. Pat. No. 5,374,412, the teachings of which are incorporated herein by reference, teach deposition of CVD-SiC having a coefficient of thermal conductivity of 300 watts per meter per degree Kelvin (300 W/mK); and experience with the method taught therein has produced polycrystalline βCVD-SiC having coefficients of thermal conductivity of 400 W/mK and upward, approaching the theoretical maximum of βSiC, i.e., that of single crystal βSiC.

The CVD-SiC coating 14 is, preferably, very thin, i.e., just sufficient to maintain its structural integrity during mandrel removal. A typical thickness is 0.005" thick.

Following deposition, the mask 26 and then the mandrel 22 are removed. Removal of the mask 26 leaves the non-CVD-SiC-coated rear portion 30 of the protection tube 12. If graphite, the mandrel is burned away. If the mandrel is a ceramic material with sufficiently high coefficient of thermal expansion, the mandrel 22 is simply withdrawn. Removal of the mask 26 and mandrel 22 leaves the completed protection tube 10, as previously described with respect to FIGS. 4a and 4b.

FIG. 5 illustrates the front end of a protection tube 10 with a thermocouple, illustrated as a doubled-over wire 33, inserted into the tip 16 with its rearward portions spaced from the interior wall of the ceramic tube 12.

Several advantages of the invention can now be more fully appreciated. The tip 16, being highly thermally conductive, provides for better thermal measurements than would a ceramic material having a lower coefficient of thermal conductivity. Also, the CVD-SiC can be deposited to extremely high purity so that the CVD-SiC-coated protection tube does not introduce impurities into the furnace or chamber as might a less pure ceramic material. Such purity is particularly advantageous in high-temperature semiconductor processing applications.

As opposed to an all CVD-SiC protective tube, the invention obviates the need for machining of CVD-SiC. Although the ceramic tube 12 must still be formed, this is relatively simple relative to machining CVD-SiC. The tip 16, requiring no machining after formation, can be very thin. As the CVD-SiC need not be machined, the cost of the protection tube is reduced relative to an all CVD-SiC tube.

Behind the tip 16, the main body of the protection tube 10 provides insulation for the portion of the thermocouple rearward of the tip. Only a thin layer of CVD-SiC covers the forward portion of the ceramic tube 12, and the ceramic tube has a lower coefficient of thermal conductivity than does CVD-SiC, providing greater insulation relative to a solid CVD-SiC protection tube. In the preferred illustrated design, the larger I.D. of the ceramic tube 12 relative to the I.D. of the tip 16, provides an insulating "dead" space between the protection tube and portions of the thermocouple rearward of the tip.

What is claimed is:

1. A thermocouple protection tube comprising
   an elongated ceramic tube having an open front end and an open rear end, and
   a silicon carbide layer covering and being in intimate contact with at least a portion of said ceramic tube adjacent said front end, and said silicon carbide layer extending forward of said open front end to form a tubular silicon carbide tip that has a closed-off front end.

2. A thermocouple protection tube according to claim 1 wherein a rear end of said silicon carbide layer is spaced from said open rear end of said ceramic tube, leaving at least a portion of said ceramic tube adjacent said open rear end not coated with said SiC layer.

3. A thermocouple protection tube according to claim 1 wherein said silicon carbide layer is formed by chemical vapor deposition.

4. A thermocouple protection tube according to claim 1 in combination with a thermocouple housed therein.

5. The combination in accordance with claim 4 wherein said thermocouple extends into said tip.

6. The combination in accordance with claim 5 wherein said thermocouple is a wire thermocouple.

7. The combination in accordance with claim 4 wherein said tip of said protection tube has an interior of circular cross-section of uniform diameter and at least a portion of said ceramic tube of said protection tube has a circular cross-section of diameter greater than said uniform diameter.

8. The protection tube in accordance with claim 1 wherein said tip has an interior of circular cross-section of uniform diameter and at least a portion of said ceramic tube has a circular cross-section of diameter greater than said uniform diameter.

* * * * *